United States Patent
Roux

(10) Patent No.: US 9,610,587 B2
(45) Date of Patent: Apr. 4, 2017

(54) ELECTROSTATIC COLLECTION DEVICE OF PARTICLES IN SUSPENSION IN A GASEOUS ENVIRONMENT

(75) Inventor: Jean-Maxime Roux, Grenoble (FR)

(73) Assignee: Commissariat á l'ènergie atomique et aux ènergies alternatives, Paris (FR)

( * ) Notice: Subject to any disclaimer, the term of this patent is extended or adjusted under 35 U.S.C. 154(b) by 213 days.

(21) Appl. No.: 13/596,254

(22) Filed: Aug. 28, 2012

(65) Prior Publication Data

US 2013/0047847 A1 Feb. 28, 2013

(30) Foreign Application Priority Data

Aug. 29, 2011 (FR) ...................................... 11 57602

(51) Int. Cl.
*B03C 3/145* (2006.01)
*B03C 3/32* (2006.01)
(Continued)

(52) U.S. Cl.
CPC ................ *B03C 3/145* (2013.01); *B03C 3/32* (2013.01); *B03C 3/41* (2013.01); *B03C 3/49* (2013.01);
(Continued)

(58) Field of Classification Search
CPC .. B03C 3/41; B03C 3/145; B03C 3/32; B03C 3/70; B03C 3/86; B03C 3/49; B03C 2201/04; F24F 3/166
(Continued)

(56) References Cited

U.S. PATENT DOCUMENTS 1,250,088 A * 12/1917 Burns ....................... B03C 3/53
313/231.01
1,329,817 A * 2/1920 Wolcott .................... B03C 3/16
55/DIG. 38
(Continued)

FOREIGN PATENT DOCUMENTS

CH WO 2011060562 A1 * 5/2011 ............... B03C 3/41
CN 101301638 A 11/2008
(Continued)

OTHER PUBLICATIONS

"Section 5.0: Electrostatic Precipitators" published online at <https://web.archive.org/web/20101228062400/http://www.epa.state.oh.us/portals/27/engineer/eguides/electro.pdf> published online on Dec. 28, 2010.*

(Continued)

*Primary Examiner* — Amber R Orlando
*Assistant Examiner* — Stephen Hobson
(74) *Attorney, Agent, or Firm* — Oblon, McClelland, Maier & Neustadt, L.L.P.

(57) ABSTRACT

An electrostatic collection device of particles in suspension in a gas including a collecting chamber with a collecting wall, part of which forms a collecting electrode. The collecting electrode faces a discharge electrode in the form of a wire, so as to create a corona discharge between the discharge electrode and the collecting electrode, the collecting wall extends to the periphery of the discharge electrode. The discharge electrode is maintained at a first end by a first holder and at the second end by a second holder, both holders made of electrically insulating material(s). At least one traversal wall protrudes from the collecting wall, and has a shape adapted to deflect the path of a liquid present in the gas and flowing on the collecting wall to the transversal (Continued)

wall such that it does not come into contact with the second holder.

22 Claims, 1 Drawing Sheet

(51) Int. Cl.
*B03C 3/41* (2006.01)
*B03C 3/49* (2006.01)
*B03C 3/70* (2006.01)
*B03C 3/86* (2006.01)
*F24F 3/16* (2006.01)

(52) U.S. Cl.
CPC .................. *B03C 3/70* (2013.01); *B03C 3/86* (2013.01); *F24F 3/166* (2013.01); *B03C 2201/04* (2013.01)

(58) Field of Classification Search
USPC ..................... 96/83, 27, 53, 88–89
See application file for complete search history.

(56) References Cited

U.S. PATENT DOCUMENTS

| | | | | |
|---|---|---|---|---|
| 1,334,231 A * | 3/1920 | Davidson | B03C 3/70 | 174/139 |
| 1,601,771 A * | 10/1926 | Rowland | B01J 19/088 | 174/15.3 |
| 1,837,489 A * | 12/1931 | Rowland | B01J 19/088 | 174/15.1 |
| 1,992,113 A * | 2/1935 | Anderson | B03C 3/40 | 313/231.01 |
| 2,443,780 A * | 6/1948 | Wintermute | B03C 3/02 | 55/524 |
| 2,567,899 A * | 9/1951 | Warburton | B03C 3/09 | 96/76 |
| 2,615,530 A * | 10/1952 | Hodson | B03C 3/16 | 55/DIG. 38 |
| 2,631,684 A * | 3/1953 | Schmidt | B03C 3/53 | 261/112.1 |
| 2,667,942 A * | 2/1954 | Wintermute | B03C 3/15 | 96/61 |
| 2,711,224 A * | 6/1955 | Herber | B03C 3/41 | 96/89 |
| 2,800,192 A * | 7/1957 | Roberts | B03C 3/025 | 96/45 |
| 2,956,640 A * | 10/1960 | Tuche et al. | | 96/49 |
| 3,054,243 A * | 9/1962 | Bowie | B03C 3/06 | 392/479 |
| 3,181,285 A * | 5/1965 | Tepolt | B03C 3/16 | 96/79 |
| 3,218,781 A * | 11/1965 | Allemann | B03C 3/16 | 261/114.1 |
| 3,238,702 A * | 3/1966 | De Seversky | B03C 3/16 | 261/112.1 |
| 3,258,897 A * | 7/1966 | Mayer | B03C 3/38 | 55/DIG. 38 |
| 3,293,829 A * | 12/1966 | Mafrica | B03C 3/70 | 174/18 |
| 3,372,529 A * | 3/1968 | Harms | B03C 3/53 | 261/112.1 |
| 3,400,513 A * | 9/1968 | Boll | B03C 3/12 | 55/DIG. 38 |
| 3,482,374 A * | 12/1969 | Shale | B03C 3/06 | 313/325 |
| 3,492,790 A * | 2/1970 | Ebert | B01D 45/14 | 261/112.1 |
| 3,558,286 A * | 1/1971 | Gourdine | B03C 3/017 | 310/10 |
| 3,701,236 A * | 10/1972 | Rotsky | B03C 3/10 | 96/40 |
| 3,742,681 A * | 7/1973 | deSeversky | B03C 3/16 | 261/112.1 |
| 3,765,154 A * | 10/1973 | Hardt | B03C 3/53 | 55/DIG. 38 |
| 3,844,205 A * | 10/1974 | Watanabe | B03C 3/12 | 266/144 |
| 3,979,189 A * | 9/1976 | Alskog | | 96/58 |
| 4,117,255 A * | 9/1978 | Kawaike | H01B 17/36 | 174/211 |
| 4,147,522 A * | 4/1979 | Gonas | B03C 3/155 | 55/303 |
| 4,177,047 A * | 12/1979 | Goland | B03C 3/49 | 55/DIG. 38 |
| 4,227,446 A * | 10/1980 | Sone | B03C 3/017 | 422/121 |
| 4,264,343 A * | 4/1981 | Natarajan | B03C 3/38 | 361/230 |
| 4,265,641 A * | 5/1981 | Natarajan | B03C 3/38 | 361/230 |
| 4,316,727 A * | 2/1982 | Hegemann | B01D 47/10 | 261/DIG. 54 |
| 4,559,064 A * | 12/1985 | Ahern | | 96/87 |
| 4,588,300 A * | 5/1986 | Guy | B25D 17/08 | 366/114 |
| 4,588,423 A * | 5/1986 | Gillingham | B03C 3/011 | 55/431 |
| 4,604,112 A * | 8/1986 | Ciliberti | B03C 3/06 | 55/302 |
| 4,883,510 A * | 11/1989 | Giusti et al. | | 55/326 |
| 4,908,047 A * | 3/1990 | Leonard | B03C 3/16 | 55/DIG. 30 |
| 5,003,774 A * | 4/1991 | Leonard | B03C 3/16 | 60/275 |
| 5,055,117 A * | 10/1991 | Cai | B03C 3/155 | 96/57 |
| 5,125,230 A * | 6/1992 | Leonard | B03C 3/16 | 55/DIG. 30 |
| 5,308,589 A * | 5/1994 | Yung | B03C 3/70 | 422/168 |
| 5,950,424 A * | 9/1999 | Nojima | B03C 3/011 | 55/DIG. 30 |
| 6,231,648 B1 * | 5/2001 | Marlowe | | 96/243 |
| 6,858,064 B2 * | 2/2005 | Bologa et al. | | 95/65 |
| 7,267,711 B2 * | 9/2007 | Liu | B03C 3/68 | 96/21 |
| 7,833,324 B2 * | 11/2010 | Chen | B03C 3/14 | 95/73 |
| 2004/0226449 A1 * | 11/2004 | Heckel | B03C 3/49 | 96/88 |
| 2008/0216659 A1 | 9/2008 | Maekawa et al. | | |
| 2008/0295687 A1 | 12/2008 | Galbrun et al. | | |
| 2009/0145741 A1 * | 6/2009 | Yu | B01D 53/75 | 204/157.15 |
| 2010/0000540 A1 | 1/2010 | Pouteau et al. | | |
| 2010/0058928 A1 * | 3/2010 | Bender | B03C 3/16 | 96/84 |
| 2014/0083297 A1 * | 3/2014 | Muller | B03C 3/41 | 96/88 |

FOREIGN PATENT DOCUMENTS

| | | | | |
|---|---|---|---|---|
| CN | 201681656 U | * | 12/2010 | |
| DE | 4326757 A1 | * | 2/1994 | ............. B03C 3/10 |
| EP | 1132699 A1 | * | 9/2001 | ............. F25J 3/0409 |
| EP | 2 108 456 A1 | | 10/2009 | |
| EP | 1 919 626 B1 | | 5/2010 | |
| FR | 2 380 818 A1 | | 9/1978 | |
| FR | WO 2007012447 A1 | * | 2/2007 | ............. B03C 3/16 |
| FR | 2 915 234 A1 | | 10/2008 | |
| FR | 2 929 860 A1 | | 10/2009 | |
| FR | 2929860 B1 | * | 12/2010 | ............. B03C 3/16 |
| GB | 697 628 A | | 9/1953 | |
| WO | WO 00/00291 A1 | | 1/2000 | |
| WO | WO 2004/041412 A1 | | 5/2004 | |

(56) References Cited

FOREIGN PATENT DOCUMENTS

WO     WO 2007/012447 A1     2/2007
WO     WO 2011060562 A1 *     5/2011

OTHER PUBLICATIONS

Preliminary Search Report issued Apr. 20, 2012 in French Patent Application No. FR 1157602 FA 755874 (with English translation of category of cited documents).
Office Action and Search Report issued on Nov. 30, 2015 in the corresponding Chinese Patent Application No. 2012103139144 (with English Translation).

* cited by examiner

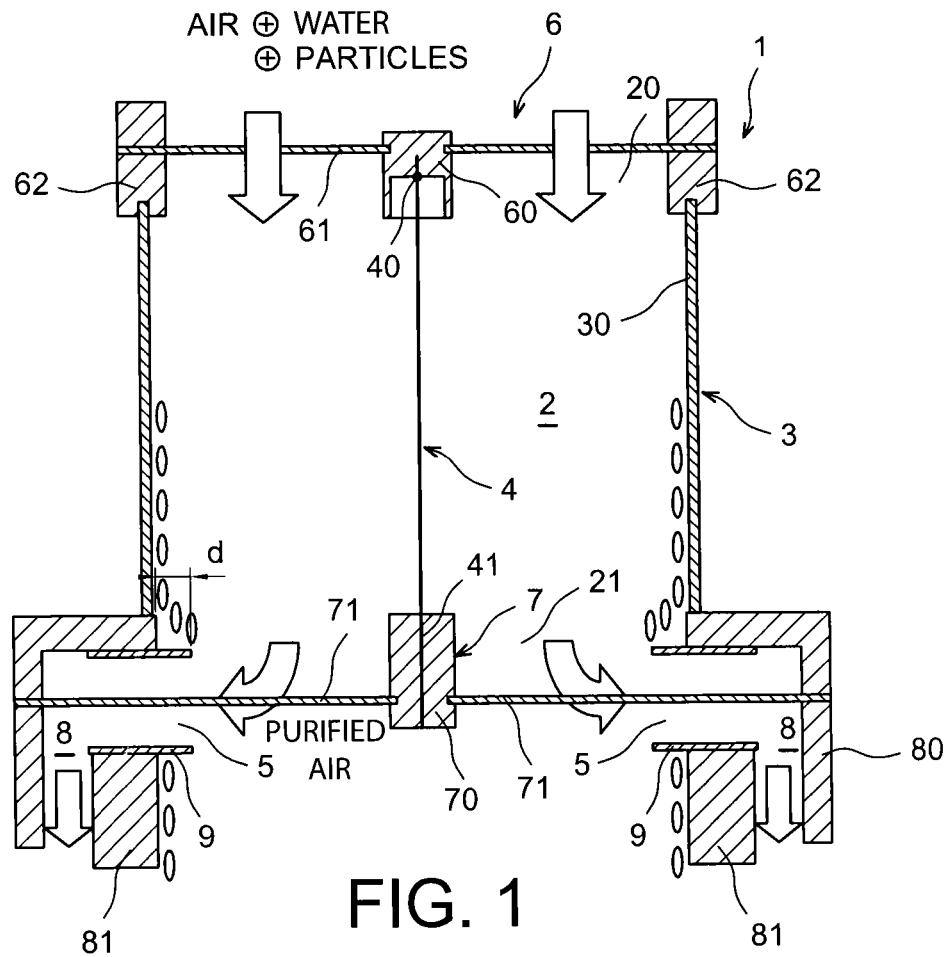
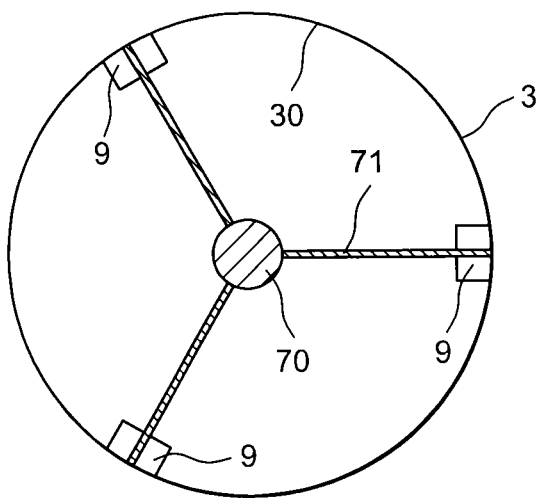
FIG. 1
FIG. 2

ELECTROSTATIC COLLECTION DEVICE OF PARTICLES IN SUSPENSION IN A GASEOUS ENVIRONMENT

TECHNICAL FIELD

The invention relates to an electrostatic collection device of particles in suspension in a gaseous environment, more particularly humid or even very humid.

More particularly, it relates to a solution for maintaining a discharge electrode in the form of a thin wire in the collecting chamber of a collection device implementing a corona discharge effect also called corona effect.

PRIOR ART

The detection and the analysis of particles present in the ambient air constitutes a major present concern, whether for the surveillance of the environment with the presence, quantifiable with difficulty, in the ambient air of nanoparticles produced by human activity, problems of health with an evident need to protect populations from airborne pathogenic agents (legionella, flu, etc.) and security issues (detection of biological attacks).

Numerous devices exist to purify (clean) the air and/or collect particles in suspension in the air. They are often classified according to the physical principle(s) implemented to collect the particles in suspension initially in the air. Among these, certain function by the application of an intense electric field to create a corona discharge effect: they are commonly called electrofilters or electrostatic precipitators.

An electrostatic precipitator (ESP) is an apparatus for collecting the particles present in a gas by applying an electric field on a path of the particles in suspension in said gas. More exactly, said electric field, strong (several tens of thousands of volts per centimeter near to the discharge electrode) is induced by two electrodes arranged near to one another: a first polarised electrode or discharge electrode, generally in wire or point form, being arranged facing a second electrode, the latter being in the form of a counter-electrode, generally of cylindrical geometry. The electric field existing between the two electrodes ionises the volume of gas situated in the inter-electrode space, and particularly a crown of gas situated around the discharge electrode. This phenomenon is called corona discharge effect or corona effect. The charges created, in migrating to the counter electrode, ionise the particles to be captured. The charged particles thereby created then migrate to the counter-electrode, on which they can be collected. Said counter-electrode is usually called collecting electrode. This phenomenon is called corona discharge effect or corona effect. Due to the intensity of the electric field required, it is necessary to use a discharge electrode that has a very small radius of curvature to reduce the electric voltage to impose. The discharge electrodes encountered are thus generally either points or wires.

But the implementation of this physical principle is tricky firstly because the high voltages required, from several thousand to several tens of thousands of volts, can lead to short circuits that damage the device itself. In fact, said devices need to be able to withstand several utilisation constraints. Firstly, the air in which the particles are in suspension may have a high level of humidity: thus, the devices need to be able to be used even in humid atmospheres. Then, it is necessary to provide for cleaning and if necessary decontamination of the devices. Finally, said devices must be able to allow the injection of a liquid such as for example water in the form of fine droplets, as described for example in the patent applications WO 2004/041412 and WO 00/00291, or vapour, as described for example in the application WO 2007/012447 to improve their collection performance and/or to improve the actual recovery of the particles collected by electrostatic effect. These latter devices can be called wet electrostatic precipitators (when drops are injected into the gas treated by the device) or semi-wet (when vapour is injected into the device).

The implementation of this physical principle is moreover particularly tricky when it is wished to produce compact devices, in other words transportable or even portable devices. In fact, in compact devices, it proves to be tricky to ensure the electrical insulation between discharge electrode and counter-electrode (collecting electrode), said insulation usually being obtained by distancing them from each other. This is all the more true in the case of wet electrostatic precipitators.

For the aforementioned reasons, the discharge electrodes employed in electrostatic precipitators are generally points, associations of points, or wires:

- points have the advantage of only being maintained at one of their ends, but since the corona discharge is created uniquely at their other end, it is thus often necessary to use a plurality thereof within a same collection device. This can adversely affect the compactness of an electrostatic precipitator.
- cylindrical conductors, for example wired, have the advantage of creating a corona discharge zone over their whole length, in other words over the whole length of the collecting chamber.

When said cylindrical conductors are sufficiently big to have a sufficient specific rigidity, their maintaining may be ensured uniquely at one point outside of the actual collecting chamber and/or by employing maintaining means of sufficient length to ensure a sufficient electrical insulation. The patent application WO 00/00291 may be cited here, which shows the maintaining of an assembly of discharge electrodes 15, 16, 17 supported by a support 14 itself maintained at a point by an insulating ring 12 outside of and above the collecting chamber 3. The patent application WO 2004/041412 may also be cited, which discloses several electrostatic precipitator configurations in which the discharge electrode 1 is maintained in the collecting chamber at a point by an insulating ring 2 outside of and above the electrode part, which creates the actual corona discharge effect.

When cylindrical conductors are too thin so as not to have their own rigidity, it proves to be essential to maintain them at their two ends. Such thin conductors are implemented as discharge electrodes in devices that it is wished to be compact and/or when the electric voltages required, although remaining high, must be minimised: cylindrical conductors are then qualified as wires. The patent applications WO 2007/012447 and FR 2929860 may be cited here, which describe the possibility of implementing such wires as discharge electrodes for compact devices. Thus, within the scope of the invention, discharge electrode in the form of a wire is taken to mean an electrically conductive element of lengthened shape typically of diameter comprised between 10 and several hundreds of μm and able to be supplied at an electric voltage comprised between several kilovolts (kV) to several tens of kV.

It is known in the technical field of high voltage electric power lines exposed to bad weather to maintain them by glass or ceramic insulators, which have in general the general shape of a plate. They are associated together to form chains of insulators. Insulators in column form with again a profile with fins to extend the leakage path are also found, in other words the distance between the terminals of the insulator, measured by following the profile of the insulator. Said proven structures are adapted to equipment of large dimensions. Their miniaturisation has a technical limit because the distance between two fins must always be sufficient so that an electrical conduction bridge cannot form between their edges. The inventor thus thinks that finned insulators cannot be adapted to maintain efficiently the electrical insulation between the electrodes of an electrostatic collection device of particles in suspension in the air that is it wished to be compact, in other words transportable or portable. In fact, when the distance between two fins is close to or less than the capillary length, an electric bridge can form between two adjacent fins. The notion of capillary length is defined later.

Furthermore, as mentioned above, among the utilisation constraints of said devices include the facility of cleaning, more particularly for those designed for the purposes of analysis of particles, and the facility of decontamination, for those designed for the purposes of biological analyses. Yet, finned insulators intrinsically have a large developed surface with in particular junctions between fins difficult to access. In other words, the inventor thinks that such finned insulators also cannot be adapted as means of electrical insulation of electrodes of an electrostatic collection device due to their difficulty to be cleaned efficiently.

Moreover, the fact of having available insulating means in the form of beams between the two electrodes is not sufficient. In fact, the inventor has noted that by using such means without additional precautions, a liquid film could form at the surface of said means. This has for consequence the formation of an electric arc between said electrodes, which could lead to a degradation of the device. Also, experience has shown that by insulating the central electrode from the annular counter electrode by simple insulating beams, electric arcs form between the discharge electrode and the counter-electrode, through the intermediary of a film deposited on the surface of said beams. The inventor has sometimes observed a fissuring of the insulating means.

As already mentioned, the patent applications WO 2007/012447 and FR 2929860 disclose compact electrostatic collection devices, in other words to make them transportable or even portable.

The general aim of the invention is to propose a device for collecting by electrostatic effect particles in suspension in a gaseous environment which may have a high humidity level, which comprises a discharge electrode in the form of a wire, the maintaining of which is reliable and enables a durable electrical insulation between the discharge electrode and the collecting electrode, without this adversely affecting the compactness of the device or the possibility of using it along any physical orientation.

DESCRIPTION OF THE INVENTION

To do this, the subject matter of the invention is an electrostatic collection device of particles in suspension in a gas comprising:

- a collecting chamber with a collecting wall, part of which forms an electrode called collecting electrode, said collecting electrode being arranged facing a discharge electrode in the form of a wire, so as to create a corona discharge between itself and the collecting electrode, said collecting wall extending to the periphery of the discharge electrode;
- first maintaining means made of electrically insulating material(s) to maintain the wire by one of its ends in the chamber, According to the invention, the device moreover comprises:

- at least one transversal wall protruding with respect to said peripheral wall,
- second maintaining means made of electrically insulating material(s) to maintain the wire by the other of its ends in the chamber, the second maintaining means being arranged downstream of said transversal wall,
- said transversal wall having a shape adapted to deflect the path of a liquid present in the gas and flowing on the collecting wall to said transversal wall such that it does not come into contact with the second maintaining means.

Advantageously, the transversal wall protrudes with respect to said collecting wall along a distance greater than the capillary length of the liquid in the gas.

It is recalled here that the capillary length is a dimension which is characteristic of a liquid in which the capillary forces and the gravitational forces are of the same magnitude. For water, the capillary length lc has for value:

$$Lc \sim \sqrt{\frac{\lambda}{\rho \cdot g}} \sim 2.7 \text{ mm}$$

in which λ represents the water surface tension constant (~70-73 $mJ/m^2$); g gravitational acceleration and ρ the density (~1 kg/L). Generally speaking, in the majority of instances, the capillary length will be considered comprised between 2 mm and 10 mm, and most generally comprised between 2 mm and 5 mm.

By judiciously choosing a transversal wall extending, with respect to the collecting wall of the chamber, by a distance greater than the capillary length of the potential liquid phase within the gas, the risks of appearance of a liquid bridge maintained by capillary forces are reduced since gravitational forces are favoured. In a preferred manner, the distance between the transversal wall and the second maintaining means is greater than said capillary length. When the transversal wall is a tube, then its internal diameter is preferably such that the distance separating the tube from the part of the maintaining means traversing it is greater than the capillary length of the liquid phase within the gas. When the transversal wall is tube shaped, it may be advantageously bevelled, such that the distance between the end of the tube and the peripheral collecting wall of the chamber decreases along the direction of flow of the liquid.

Thus, according to the invention, maintaining means of the second end of wire on the side of the outlet of the gas which extends or in other words are suspended from a zone outside of the collecting chamber are defined, said specific zone not being wetted by the potential liquid film containing the particles due to the deviation, by the transversal wall, of the liquid flowing along the collecting wall.

Thus, when a liquid is present on the collecting wall, the risks are reduced of wetting the second maintaining means, which are on the side of the outlet of the gaseous environment due to the presence of said transversal wall and the risks of creating a dielectric breakdown thereof are thus reduced.

Advantageously, the transversal wall delimits an opening, in the collecting wall, adapted to let pass the second maintaining means and fix them at a distance from the collecting chamber. Thus, the fastening of the maintaining means is moved away from the ionised zone and thus even in the case of liquid being carried along by capillarity on the transversal wall, the risk of dielectric breakdown is further reduced since the liquid carried along can at the worst wet said maintaining means uniquely at their fastening distant from the ionised zone in the collecting chamber.

According to a preferred embodiment, the opening is connected to suction means, which make it possible to suck the gas exempt of particles collected downstream of the collecting chamber. Thus, according to this embodiment, not only the transversal wall has for function the deflection of the liquid, which flows along the collecting wall, towards an actual collection but moreover it serves to guide the gas downstream of the collecting chamber. Moreover, the gas sucked up advantageously makes it possible to dry and/or carry along any droplets and/or any liquid film that could be capable of wetting the inside of the transversal wall and/or the maintaining means that pass through the opening.

According to a preferred embodiment, the peripheral collecting wall is cylindrical, the device comprises a number equal to n transversal walls spread out angularly spaced apart by $2\Pi/n$ and the second maintaining means are constituted of a central support and a number equal to n suspension beams fixed to the central support, also spread out angularly spaced apart by $2\Pi/n$ and which extend individually in the space delimited by each transversal wall. Advantageously, the number n is equal to three.

According to an embodiment, a supply cable of the discharge electrode may be laid out in the same way as the second maintaining means. It may for example be integral with a second maintaining means. Thus, the second maintaining means, apart from its functions of mechanically maintaining and electrically insulating the discharge electrode, acts as support for the supply cable of the collecting electrode. In other words, when the second maintaining means is constituted of a central support and of n suspension beams fixed to the central support, at least one suspension beam and the support are traversed by an electrical supply conductor of the charge electrode wire.

Again advantageously, the assembly constituted of a suspension beam traversed by an electrical supply conductor is constituted of an insulated high voltage shielded cable made of PTFE or PVDF. The electrically insulating material of the second maintaining means and/or transversal wall(s) is non wetting vis-à-vis the liquid phase of the fluid, and preferably hydrophobic.

The invention also relates to the use of the electrostatic collection device described previously in which the gas is air potentially containing water in liquid or vapour form. Preferably, the use of the device is as an air purifier.

BRIEF DESCRIPTION OF DRAWINGS

Other advantages and characteristics of the invention will become clearer on reading the detailed description of the invention made with reference to the following figures, among which:

FIG. 1 is a longitudinal sectional schematic view of an electrostatic collection device according to the invention;

FIG. 2 is a transversal sectional schematic view of a device according to FIG. 1.

DETAILED DESCRIPTION OF PARTICULAR EMBODIMENTS

In the description that follows, the terms "inlet", "outlet", "upstream", "downstream" are used with reference to the direction of suction of the air which takes place vertically from the top to the bottom. Similarly, the terms "upper", "lower", "above", "below" are used with reference to the vertical physical orientation of the electrostatic collection device according to the representation of the invention in the figures.

The device 1 according to the invention constitutes a device for collecting particles in suspension in a fluid containing air as gaseous phase and thus is an electrostatic precipitator for purifying the air. In such a device, a liquid, for example water or an aqueous solution, may be admitted:
either in a simultaneous manner to the gas treated by the device (for example in the form of water vapour or droplets), and this is then known as a wet (injection of droplets) or semi-wet (injection of vapour) electrostatic precipitator,
or following the treatment of a gas, and, in this case, along the collecting wall, in order to collect the collected particles,
or prior to the treatment of a gas, and, in this case, along the collecting wall, in order to clean the device before its use.

These different types of admission of liquid in the device (before treatment, during treatment, following treatment) may be cumulated.

In all instances, droplets of liquid form and/or flow along the collecting wall, and, when the liquid is conductive, it is necessary to avoid said droplets accumulating and forming an electrical bridge between the two electrodes of the device, at the surface of the maintaining means.

Gas is taken to mean a fluid medium comprising a gas or a gaseous mixture, knowing that said medium may also comprise solid particles as well as a liquid dispersed in the form of droplets or vapour.

Treatment of a gas is taken to mean the electrostatic extraction of particles carried along by said gas and their collection by means of the collecting electrode.

The device 1 firstly comprises a collecting chamber 2 with an inlet opening 20 in the upper part through which the air containing particles in suspension to be collected penetrates through suction from an outlet opening 21 in the lower part of the chamber. The collecting chamber 2 is delimited by a collecting wall 3, including a first electrode 30 called collecting electrode. When the device is in operation, said collecting electrode 30 may be earthed. As illustrated, the collecting wall 3 comprises the collecting electrode 30 over its whole height, but may also extend upstream and/or downstream of said electrode.

Inside the collecting chamber 2 is arranged a second electrode 4 called discharge electrode in the form of a wire. In this example, the discharge electrode 4 extends along the axis of the collecting electrode 3. The surface of the collecting electrode 30 facing the second electrode 4 forms part of the collection surface, because it is intended to receive the particles separated by the electric field defined between the discharge electrode 4 and the annular collecting electrode 30. In this example, the collecting electrode 30 totally surrounds the discharge electrode 4, in order to obtain an optimal collection surface.

The collecting electrode 30 may also only partially surround the discharge electrode 4, defining not a cylinder but a portion of cylinder.

The collecting electrode 30 may also be flat, and situated facing the discharge electrode 4.

The discharge electrode 4 is typically a conductive wire of diameter comprised between 10 and several hundreds of microns (μm): it is adapted to create a corona discharge between itself and the collecting electrode 3 when supplied with an electric voltage comprised between several kV and several tens of kV.

For example, the device represented may be an electrostatic precipitator of wet or semi-wet type in which the gas to be treated comprises vapour and/or a liquid phase, for example in the form of droplets. In these different cases, droplets are likely to form on the collecting wall. Thus, when the device is in operation, the gas containing particles in suspension, as well as the vapour and/or and the liquid employed to facilitate the capture of the particles collected, penetrates into the chamber 2 through the inlet 20 between the discharge electrode 4 and the collecting electrode 30. The particles in suspension in the air are then collected on the collecting electrode 30, by corona discharge, and the gas is evacuated, downstream of the collecting chamber, through the outlet openings 5 in communication with the outlet 21 of chamber 2 as detailed hereafter.

As described previously, by addition of a liquid dispersed in the form of droplets or in vapour phase, simultaneously with the gas, droplets are collected, carrying along the extracted particles, on the collecting wall.

It is also possible to inject a liquid following the treatment of the gas, in order to form droplets at the surface of the collecting wall, said droplets then carrying along the particles extracted during the treatment.

On account of the absence of its own sufficient rigidity of the conductive wire constituting the discharge electrode, according to the invention it is provided to maintain it in the collecting chamber 2 on the one hand by first maintaining means 6 arranged above the inlet opening 20. Said first means 6 consist of a central support 60 made of electrically insulating material in which the upper end 40 of the wire is maintained, and of suspension beams 61 also made of electrically insulating material each fixed on the one hand to the central support 60 and on the other hand to peripheral supports 62 made of electrically insulating material itself fixed to the upper end of the collecting wall 3.

Second maintaining means 7 arranged below the outlet opening 21 of the collecting chamber 2 are moreover provided. Said second means 7 consist of a central support 70 made of electrically insulating material in which the lower end 41 of the wire is maintained, and of suspension beams 71 also made of electrically insulating material each fixed on the one hand to the central support 70 and on the other hand to another peripheral wall 80 delimiting a duct 8 for evacuating the purified air as explained below. Preferably, the evacuation ducts 8 are made of electrically insulating material(s).

More exactly, according to the invention, the second maintaining means 7 are designed so that the suspension beams 71 each extend inside an outlet opening 5 delimited by a wall 9 transversal to the collecting wall 3 downstream of the actual collecting chamber 2.

The transversal wall 9, preferably a tube, or a portion of tube, of circular or polygonal section, has a shape adapted to deflect the path of the droplets flowing along the collecting electrode 30, carried along by gravity and by the suction effect up to said transversal wall 9 such that they cannot come directly into contact with the suspension beams 71. Said transversal wall, in the form of tube or portion of tube, protrudes from the collecting wall, along a length d greater than or equal to the capillary length of the liquid within the fluid.

When the transversal wall is in tube form, it may be advantageously bevelled, such that the distance between the end of the tube and the peripheral collecting wall of the chamber 3 decreases along the direction of flow of the liquid.

Preferably, the supports 60, 70 and the suspension beams 61, 71 are made of an electrically insulating material non wetting for the liquid(s) employed in the device, in other words circulating in the collecting chamber 2. In so far as the liquids employed are often aqueous solutions, the electrically insulating material is advantageously hydrophobic such as for example polytetrafluoroethylene (code PTFE) such as Teflon®, or polyvinylidene fluoride (code PVDF).

As shown in FIG. 2, the suspension beams are preferentially three in number spread out angularly at 120° to each other and centre the central support 70 of the discharge electrode 4 along the axis of the cylindrical collecting chamber 2. It is possible to provide to have an identical assembly at the two ends 40, 41 of the wire of the discharge electrode 4 a same number of suspension beams 61 with the same relative layout with respect to each other and with respect to the central support 60.

Similarly, the transversal walls 9 are preferably made of an electrically insulating material non wetting for the liquid(s) employed in the device, in other words circulating in the collecting chamber 2. Like the maintaining means 7, the electrically insulating material constituting the transversal walls is advantageously hydrophobic such as for example polytetrafluoroethylene (code PTFE) such as Teflon®, or polyvinylidene fluoride (code PVDF).

When the device is in operation, the purified air or exempt of particles in suspension initially is sucked up by the outlet openings 5 delimited between tubes 9 and suspension beams 71, to the evacuation duct 8 delimited by the walls 80, 81 and connected to pumping means (ventilation) not represented. In other words, in operation the purified gas is sucked up through the openings 5 delimited by the tubes 9, which has the advantage moreover of potentially drying the suspension beams 71.

In order to limit the power thereof and incidentally their level of emitted noise, care is advantageously taken so that the total surface of the outlet openings 5 is sufficiently big so as not to create too great a resistance to the flow of the air.

According to an embodiment, a supply cable of the discharge electrode is integral with a second maintaining means. Thus, the second maintaining means, apart from its functions of mechanically maintaining and electrically insulating the discharge electrode, acts as support for the supply cable of the collecting electrode. Thus, according to an advantageous embodiment variant, at least one suspension beam 71 is traversed by an electrical supply conductor of the wire 4: it may thus be an insulated HT high voltage shielded cable made of PTFE or PVDF. The cable may also be arranged in the same way as the second maintaining elements, while being independent (in other words non integral) of the latter.

The invention claimed is:

1. A device for electrostatic collection of particles suspended in a gas, comprising:
    a collecting chamber including a collecting wall, an inlet opening at an upper end thereof, and an outlet opening at a lower end thereof, at least a part of the collecting wall being a collecting electrode;

a discharge electrode disposed inside the collecting chamber, the discharge electrode being a wire extending along a central axis of the collecting chamber,
the collecting electrode being disposed to face the discharge electrode,
the collecting electrode and the discharge electrode being configured to create a corona discharge in a space delimited therebetween,
the collecting wall extending to a periphery of the discharge electrode,
the collecting wall being configured to collect, on an inner surface thereof, droplets present in the gas and carrying the particles;
a first electrically insulating support disposed at the upper end of the collecting chamber and connected to a first end of the wire;
a second electrically insulating support disposed at the lower end of the collecting chamber and connected to a second end of the wire,
the first electrically insulating support and the second electrically insulating support being configured to maintain the wire in extension along the central axis of the collecting chamber; and
at least one electrically insulating transversal wall disposed below the collecting wall toward the lower end of the collecting chamber, protruding beyond the inner surface of the collecting wall toward the discharge electrode in a direction transverse to the central axis of the collecting chamber, said transversal wall
having a shape configured to deflect a flow of the collected droplets along an exterior surface of said transversal wall and to prevent direct contact between the collected droplets and the second electrically insulating support, and
defining the outlet opening and a passage through which a portion of the second electrically insulating support extends away from the collecting chamber.

2. The device according to claim 1, wherein the protruding of said transversal wall is along a distance greater than a capillary length of the droplets in the gas.

3. The device according to claim 1, wherein the second electrically insulating support passes through the outlet opening and the passage, and is fixed at an outer wall away from the collecting chamber.

4. The device according to claim 1,
wherein the collecting wall is cylindrical,
wherein the at least one electrically insulating transversal wall includes n transversal walls angularly spaced apart by $2\pi/n$, and
wherein the second electrically insulating support comprises a central support and n suspension beams fixed to the central support, also angularly spaced apart by $2\pi/n$, the suspension beams individually extending in the delimited space.

5. The device according to claim 4, wherein n is equal to three.

6. The device according to claim 4, wherein at least one suspension beam of the n suspension beams, and the support, are traversed by an electrical supply conductor of the discharge electrode.

7. The device according to claim 1, wherein an electrically insulating material of the first electrically insulating support and the second electrically insulating support is a hydrophobic material.

8. The device according to claim 1, wherein the electrically insulating material of said transversal wall is a hydrophobic material.

9. The device according to claim 6,
wherein an electrically insulating material of the first electrically insulating support and the second electrically insulating support is a hydrophobic material, and
wherein an assembly including the at least one suspension beam traversed by the electrical supply conductor includes an insulated high-voltage shielded cable of polytetrafluoroethylene (PTFE) or of polyvinylidene fluoride (PVDF).

10. The device according to claim 3, wherein said transversal wall includes at least one tube having an internal diameter such that a distance separating the at least one tube from the portion of the second electrically insulating support passing through the passage is greater than a capillary length of the droplets in the gas.

11. The device according to claim 1, wherein said device is an air purifier.

12. A method of electrostatic collection of particles suspended in a gas, comprising:
providing a collecting chamber including a collecting wall, an inlet opening at an upper end thereof, and an outlet opening at a lower end thereof, at least a part of the collecting wall being a collecting electrode;
providing a discharge electrode inside the collecting chamber, the discharge electrode being a wire extending along a central axis of the collecting chamber, the collecting electrode facing the discharge electrode, the collecting wall extending to a periphery of the discharge electrode;
providing a first electrically insulating support at the upper end of the collecting chamber and connected to a first end of the wire;
providing a second electrically insulating support at the lower end of the collecting chamber and connected to a second end of the wire,
the first electrically insulating support and the second electrically insulating support maintaining the wire in extension along the central axis of the collecting chamber,
providing at least one electrically insulating transversal wall below the collecting wall toward the lower end of the collecting chamber, said transversal wall
protruding beyond the inner surface of the collecting wall toward the discharge electrode in a direction transverse to the central axis of the collecting chamber, and
defining the outlet opening and a passage through which a portion of the second electrically insulating support extends away from the collecting chamber;
creating a corona discharge in a space delimited between the collecting electrode and the discharge electrode; and
collecting, on an inner surface of the collecting wall, droplets present in the gas and carrying the particles,
wherein said transversal wall deflects a flow of the collected droplets along an exterior surface of said transversal wall and prevents direct contact between the collected droplets and the second electrically insulating support.

13. The method according to claim 12, wherein said transversal wall protrudes along a distance greater than a capillary length of the droplets in the gas.

14. The method according to claim 12, wherein the second electrically insulating support passes through the outlet opening and the passage, and is fixed at an outer wall away from the collecting chamber.

15. The method according to claim 12,
wherein the collecting wall is cylindrical,
wherein the providing at least one electrically insulating transversal wall further comprises providing n transversal walls angularly spaced apart by 2π/n, and
wherein the second electrically insulating support comprises a central support and n suspension beams fixed to the central support, also angularly spaced apart by 2π/n, the suspension beams individually extending in the delimited space.

16. The method according to claim 15, wherein n is equal to three.

17. The method according to claim 15, wherein at least one suspension beam of the n suspension beams, and the support, are traversed by an electrical supply conductor of the discharge electrode.

18. The method according to claim 12, wherein an electrically insulating material of the first electrically insulating support, of the second electrically insulating support, and of said transversal wall is a hydrophobic material.

19. The method according to claim 17,
wherein an electrically insulating material of the first electrically insulating support and the second electrically insulating support is a hydrophobic material, and
wherein an assembly including the at least one suspension beam traversed by the electrical supply conductor includes an insulated high-voltage shielded cable of polytetrafluoroethylene (PTFE) or of polyvinylidene fluoride (PVDF).

20. The method according to claim 14, wherein said transversal wall includes at least one tube having an internal diameter such that a distance separating the at least one tube from the portion of the second electrically insulating support passing through the passage is greater than a capillary length of the droplets in the gas.

21. The device according to claim 1, further comprising an electrically insulating evacuation duct disposed below and in fluid communication with the at least one electrically insulating transversal wall and the outlet opening, the electrically insulating evacuation duct being configured to carry the gas, free of the collected droplets carrying the particles, from an interior of said transversal wall away from the collecting chamber.

22. The method according to claim 12, further comprising providing an electrically insulating evacuation duct disposed below and in fluid communication with said transversal wall and the outlet opening, wherein the electrically insulating evacuation duct carries the gas, free of the collected droplets carrying the particles, from an interior of said transversal wall away from the collecting chamber.

* * * * *